United States Patent
Oniwa et al.

(10) Patent No.: US 8,924,080 B2
(45) Date of Patent: Dec. 30, 2014

(54) ELECTRIC POWER STEERING DEVICE

(75) Inventors: Yoshihiro Oniwa, Utsunomiya (JP);
Yasuo Shimizu, Shimotsuke (JP);
Atsuhiko Yoneda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/236,239

(22) PCT Filed: May 22, 2012

(86) PCT No.: PCT/JP2012/063041
§ 371 (c)(1),
(2), (4) Date: Jan. 30, 2014

(87) PCT Pub. No.: WO2013/018420
PCT Pub. Date: Feb. 7, 2013

(65) Prior Publication Data
US 2014/0195122 A1 Jul. 10, 2014

(30) Foreign Application Priority Data

Aug. 4, 2011 (JP) ................................. 2011-170591

(51) Int. Cl.
*B62D 5/04* (2006.01)
*G05D 17/02* (2006.01)

(52) U.S. Cl.
CPC ............. *B62D 5/0463* (2013.01); *G05D 17/02* (2013.01)
USPC ........................................................... 701/41

(58) Field of Classification Search
USPC ......................................................... 701/41
See application file for complete search history.

(56) References Cited

U.S. PATENT DOCUMENTS

| 6,470,994 | B1 * | 10/2002 | Shimizu et al. | 180/446 |
| 6,687,588 | B2 * | 2/2004 | Demerly et al. | 701/41 |
| 6,942,057 | B2 * | 9/2005 | Boloorchi et al. | 180/446 |
| 7,049,888 | B2 | 5/2006 | Soda | |
| 7,711,464 | B2 * | 5/2010 | Kaufmann | 701/41 |
| 7,742,858 | B2 * | 6/2010 | Tamaizumi | 701/41 |

(Continued)

FOREIGN PATENT DOCUMENTS

| JP | H03-118173 U | 12/1991 |
| JP | 2004-098754 A | 4/2004 |

(Continued)

OTHER PUBLICATIONS

Japanese Office Action dated Oct. 7, 2014 issued over the JP national phase Patent Application No. 2013-526775 with the English translation of pertinent portion.

*Primary Examiner* — Thomas Tarcza
*Assistant Examiner* — Alex C Dunn
(74) *Attorney, Agent, or Firm* — Carrier Blackman & Associates, P.C.; William D. Blackman; Joseph P. Carrier

(57) ABSTRACT

Provided is an electric power steering device in which the operation feeling is improved without a decrease in commercial value. A phase compensation unit performs a frequency shift on a compensation frequency band compensated by the phase compensation unit. The phase compensation unit performs phase-shift in the compensation frequency band through a frequency shift process, instead of an increase in compensation gain. Therefore, it is possible to minimize occurrences of minute vibrations and abnormal noise in the steering system including the motor that accompany an increase in gain, and to improve the operation feeling and commercial value.

5 Claims, 7 Drawing Sheets

(56) References Cited

U.S. PATENT DOCUMENTS

| | | | |
|---|---|---|---|
| 8,019,507 B2 * | 9/2011 | Kurishige et al. | 701/41 |
| 8,050,825 B2 * | 11/2011 | Ikeda et al. | 701/42 |
| 8,267,220 B2 * | 9/2012 | Sugiyama et al. | 180/446 |
| 8,326,493 B2 * | 12/2012 | Kezobo et al. | 701/42 |
| 8,423,245 B2 * | 4/2013 | Kimura et al. | 701/41 |
| 8,612,094 B2 * | 12/2013 | Champagne et al. | 701/41 |
| 8,660,749 B2 * | 2/2014 | Hayama et al. | 701/41 |
| 8,820,469 B2 * | 9/2014 | Sakaguchi | 180/402 |
| 8,825,301 B2 * | 9/2014 | Sugawara et al. | 701/42 |
| 2007/0055425 A1 * | 3/2007 | Oya et al. | 701/41 |
| 2007/0118262 A1 * | 5/2007 | Nishizaki et al. | 701/41 |
| 2012/0232759 A1 | 9/2012 | Oniwa et al. | |
| 2013/0214718 A1 | 8/2013 | Ikeda et al. | |
| 2013/0238193 A1 * | 9/2013 | Bolourchi et al. | 701/42 |

FOREIGN PATENT DOCUMENTS

| | | |
|---|---|---|
| JP | 2004-322741 A | 11/2004 |
| JP | 2004-343373 A | 12/2004 |
| JP | 2009-212729 A | 9/2009 |
| WO | 2011/062145 A1 | 5/2011 |
| WO | 2012/060180 A1 | 5/2012 |

* cited by examiner

ELECTRIC POWER STEERING DEVICE

TECHNICAL FIELD

The present invention relates to an electric power steering apparatus (device) for transmitting power from a motor (electric motor), which serves as a steering assistive force, to the steering system of a vehicle when the vehicle is steered by an operating member such as a steering handle (steering wheel) or the like, for thereby reducing the burden on a driver of the vehicle in moving the operating member such as the steering handle or the like.

BACKGROUND ART

Recently, there have widely been employed electric power steering apparatus, which detect a steering torque generated by a steering handle with a steering torque sensor, and control a motor to generate a steering assistive force depending on the detected steering torque, for thereby enabling the vehicle to be turned with a light steering force applied to the steering handle.

Such electric power steering apparatus perform a phase compensation on the steering torque, which is detected by the steering torque sensor, in order to improve the steering sensation experienced by the driver.

As shown in FIG. 6 of the accompanying drawings, Japanese Laid-Open Patent Publication No. 2004-098754 (JP2004-098754A) discloses in paragraph [0010] and FIG. 4 thereof an electric power steering apparatus, which performs a phase compensation of the type described above. According to the disclosed electric power steering apparatus, a steering torque, which is applied to a steering wheel 201, is transmitted through a steering shaft 202 (an input shaft 202A and an output shaft 202B) to a steering mechanism 203. At this time, a drive force generated by an electric motor M is mechanically transmitted to the steering mechanism 203 as a steering assistive force.

The input shaft 202A and the output shaft 202B are coupled to each other by a torsion bar 204. The direction and magnitude of a twist in the torsion bar 204 is detected as a steering torque signal T by a torque sensor 205.

Using a target current setter 212, a controller 210 sets a target current value, which depends on the steering torque signal detected by the torque sensor 205 and a vehicle speed V detected by a vehicle speed sensor 206. The controller 210 controls a motor driver 220 based on the set target current value, so as to impart a drive current to the electric motor M, which applies a steering assistive force to the steering mechanism 203 that depends on the steering torque signal T and the vehicle speed V.

The controller 210 includes a phase compensation processor 211 for performing a phase compensation process in order to adjust the gain and phase of the steering torque signal T from the torque sensor 205, and the target current setter 212 for setting a target current value, which depends on the steering torque signal T that is phase-compensated by the phase compensation processor 211 and the vehicle speed V from the vehicle speed sensor 206.

The controller 210 also includes a phase compensation gain setter 216 for setting a phase compensation characteristic curve, which is used in the phase compensation processor 211. More specifically, as the steering torque signal T detected by the torque sensor 205 becomes greater, a torque-adapted gain setter 214 reduces a gain that is set in the phase compensation processor 211 via a multiplier 215, while simultaneously performing a greater-lag phase compensation, i.e., a smaller-advance phase compensation. As the vehicle speed V detected by the vehicle speed sensor 206 becomes lower, a vehicle-speed-adapted gain setter 213 reduces the gain that is set in the phase compensation processor 211 via the multiplier 215, together with performing a greater-lag phase compensation, i.e., a smaller-advance phase compensation.

Such characteristic changes are shown in FIG. 7 of the accompanying drawings. A gain G is increased (shifted) commensurate with changing from a gain characteristic curve L0 to a gain characteristic curve L1, and a phase θ is shifted commensurate with changing from a phase characteristic curve L10 to a phase characteristic curve L11.

SUMMARY OF INVENTION

However, according to the electric power steering apparatus disclosed in JP2004-098754A, which performs phase compensation using a gain shift, since a steering delay in the steering system is reduced at a frequency of about several tens of hertz [Hz], as indicated by the vertical arrow 222 shown in FIG. 7, the gain is increased in a particular frequency band (100 to 300 [Hz]) 224 that is susceptible to noise due to the fact that the gain characteristic curve L0 is changed to the gain characteristic curve L1. As a result, the steering mechanism 203 including the electric motor M is liable to cause fine vibrations and abnormal noise, which tends to lower the commercial value of the electric power steering apparatus.

The present invention has been made in view of the above problems. It is an object of the present invention to provide an electric power steering apparatus, which allows the driver of a vehicle to experience an improved steering sensation, while the commercial value of the electric power steering apparatus is maintained.

In the following description, a steering torque and an assistive current have different signs depending on the direction (a rightward direction or a leftward direction) in which a steering handle is turned. According to the description of the present invention, for facilitating understanding, the magnitude of a steering torque refers to an absolute value magnitude of the steering torque, whereas the magnitude of an assistive current refers to an absolute value magnitude of the assistive current.

According to the present invention, there is provided an electric power steering apparatus for controlling an electric motor depending on a steering torque applied to an operating member, and transmitting a drive force generated by the electric motor to a steering mechanism to assist in steering a vehicle, comprising a steering torque sensor for detecting the steering torque, a phase compensator for phase-compensating a torque signal output by the steering torque sensor, and an assistive current determiner for determining an assistive current that flows through the electric motor based on at least the torque signal, which is phase-compensated by the phase compensator, wherein the phase compensator performs a frequency shifting process for frequency-shifting both a pole of a minimum frequency and a zero point of a minimum frequency toward higher frequencies, or for frequency-shifting both a pole of a minimum frequency and a zero point of a minimum frequency toward lower frequencies, for thereby changing a compensation frequency band that is compensated by the phase compensator.

According to the present invention, the phase compensator performs a phase shift in a compensation frequency band by performing the frequency shifting process, rather than by increasing a compensation gain as disclosed in JP2004-098754A. Therefore, it is possible to minimize generation of fine vibrations and abnormal noise of a steering system including the electric motor due to an increase in gain. Hence, the electric power steering apparatus allows the driver of the vehicle to experience an improved steering sensation.

The electric power steering apparatus may further comprise a vehicle speed detector for detecting a vehicle speed, wherein the phase compensator may change, toward higher frequencies, the compensation frequency band that is compensated by the phase compensator according to the frequency shifting process, as the vehicle speed detected by the vehicle speed detector becomes higher.

The phase compensator may change, toward lower frequencies, the compensation frequency band that is compensated by the phase compensator according to the frequency shifting process, as the torque signal detected by the steering torque sensor becomes greater.

The phase compensator may change, toward lower frequencies, the compensation frequency band that is compensated by the phase compensator according to the frequency shifting process, as the assistive current determined by the assistive current determiner becomes greater.

The phase compensator may calculate an assistive gain as a ratio of the assistive current determined by the assistive current determiner to the torque signal detected by the steering torque sensor, and change, toward lower frequencies, the compensation frequency band that is compensated by the phase compensator according to the frequency shifting process, as the calculated assistive gain becomes greater.

According to the present invention, since the phase compensator performs a phase shift in the compensation frequency band by performing the frequency shifting process, rather than by increasing the compensation gain, it is possible to minimize generation of fine vibrations and abnormal noise of the steering system including the electric motor due to an increase in gain. Hence, the electric power steering apparatus allows the driver of the vehicle to experience an improved steering sensation. As a consequence, the commercial value of the electric power steering apparatus, and hence the commercial value of a vehicle in which the electric power steering apparatus is incorporated, can be increased.

DESCRIPTION OF EMBODIMENTS

Embodiments of the present invention will be described below with reference to the accompanying drawings.

Figure 1:
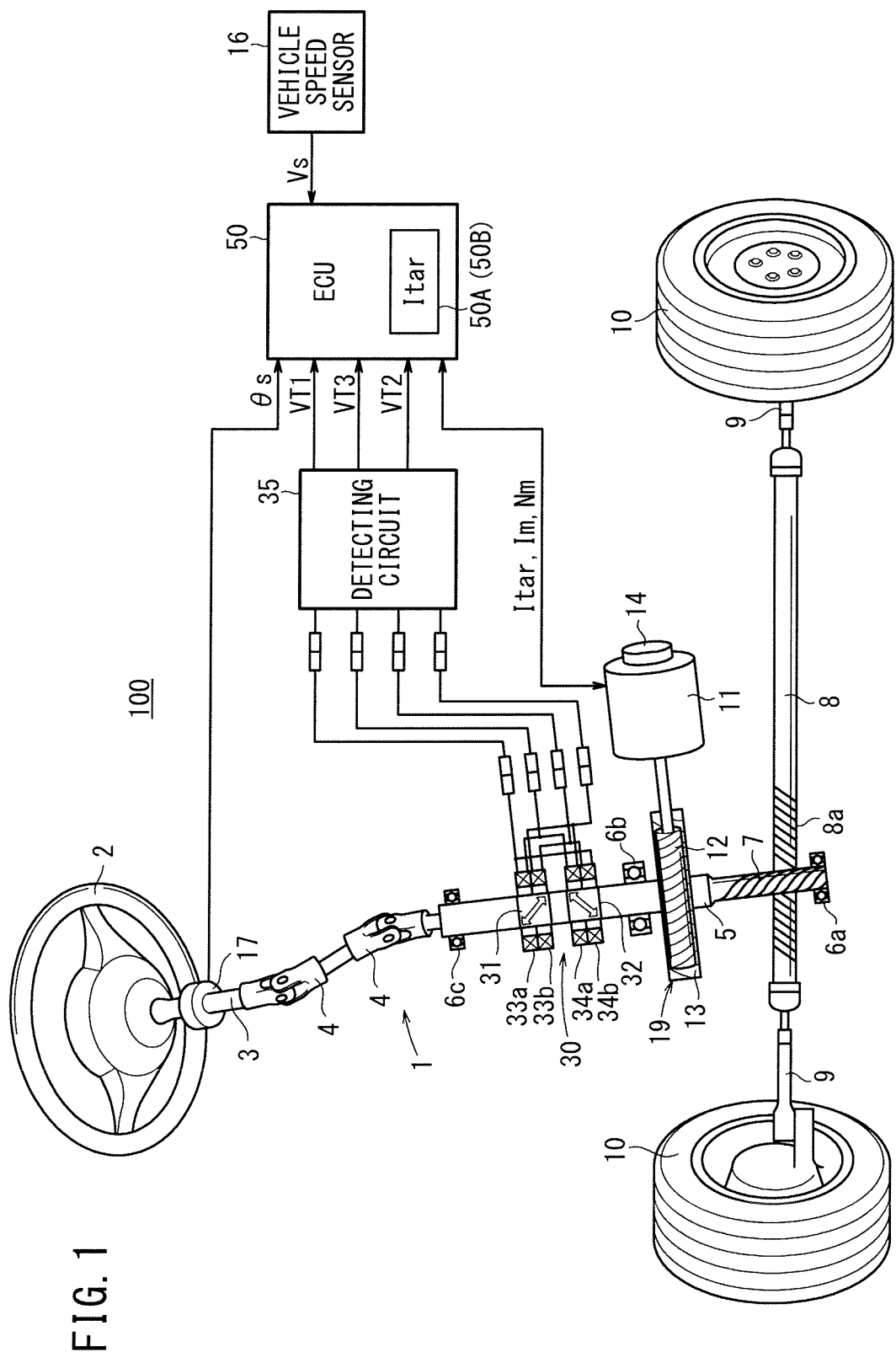
FIG. 1 is a view of an electric power steering apparatus according to an embodiment of the present invention.

FIG. 1 is a view of an electric power steering apparatus 100 according to an embodiment of the present invention.

As shown in FIG. 1, the electric power steering apparatus 100 includes a steering shaft 1, which is coupled to a steering handle 2. The steering shaft 1 includes a main steering shaft 3 joined integrally to the steering handle 2, and a pinion shaft 5 having a pinion 7 of a rack and pinion mechanism. The main steering shaft 3 and the pinion shaft 5 are coupled to each other by a universal joint 4.

Lower, intermediate, and upper portions of the pinion shaft 5 are supported respectively by bearings 6a, 6b, 6c, with the pinion 7 being disposed on a lower end portion of the pinion shaft 5. The pinion 7 is held in mesh with rack teeth 8a of a rack shaft 8, which is movable reciprocally in a transverse direction of a vehicle in which the electric power steering apparatus 100 is incorporated. Left and right front wheels 10 serve as steerable wheels, which are coupled by tie rods 9 to respective opposite ends of the rack shaft 8.

When the steering handle 2 is turned, the steering handle 2 is capable of performing an ordinary rack and pinion steering action, so as to steer the front wheels 10 in order to change the direction in which the vehicle is driven. A steering mechanism is constituted from the rack shaft 8, the rack teeth 8a, and the tie rods 9.

The electric power steering apparatus 100 also includes a motor (electric motor) 11 for supplying a steering assistive force to the pinion shaft 5, for thereby reducing the steering force required to be applied to the steering handle 2. The motor 11 has an output shaft with a worm gear 12 mounted thereon, which is held in mesh with a worm wheel gear 13 mounted on the pinion shaft 5 below the bearing 6b on an intermediate portion of the pinion shaft 5. The worm gear 12 and the worm wheel gear 13 jointly make up a speed reducing mechanism 19, which smoothly converts a rotational drive force of the motor 11 into a rotational drive force of the pinion shaft 5 at a given boosted ratio.

Between the bearing 6b on the intermediate portion of the pinion shaft 5 and the bearing 6c on a lower portion of the pinion shaft 5, a known type of magnetostrictive steering torque sensor 30 is provided for detecting a torque on the pinion shaft 5 (steering shaft 1), based on a change caused in a magnetic characteristic by magnetostriction.

The magnetostrictive steering torque sensor 30 principally comprises a first magnetostrictive film 31 and a second magnetostrictive film 32, which are disposed in an annular manner fully around an outer circumferential surface of the pinion shaft 5, a first detecting coil 33a and a second detecting coil 33b, which are disposed in confronting relation to the first magnetostrictive film 31, a third detecting coil 34a and a fourth detecting coil 34b, which are disposed in confronting relation to the second magnetostrictive film 32, and a detecting circuit 35, which is connected to the first through fourth detecting coils 33a through 34b.

Each of the first and second magnetostrictive films 31, 32 comprises a metal film made of a material having a magnetic permeability that changes greatly under strain, e.g., an Ni—Fe alloy film, which is deposited by plating on the outer circumferential surface of the pinion shaft 5.

The magnetic anisotropy of the first magnetostrictive film 31 is inclined about 45° to the axis of the pinion shaft 5, and the magnetic anisotropy of the second magnetostrictive film 32 is inclined about 90° to the direction of the magnetic anisotropy of the first magnetostrictive film 31. In other words, the respective magnetic anisotropies of the two magnetostrictive films 31, 32 are kept substantially 90° out of phase with each other.

The first detecting coil 33a and the second detecting coil 33b are disposed coaxially around the first magnetostrictive film 31, with a gap left between the first magnetostrictive film 31 and both of the first detecting coil 33a and the second detecting coil 33b. The third detecting coil 34a and the fourth detecting coil 34b are disposed coaxially around the second magnetostrictive film 32, with a gap left between the second magnetostrictive film 32 and both of the third detecting coil 34a and the fourth detecting coil 34b.

Since the magnetic anisotropies of the first and second magnetostrictive films 31, 32 are oriented as described above, when a torque (steering torque) is applied to the pinion shaft 5, a compressive force is applied to one of the first and second magnetostrictive films 31, 32, whereas a tensile force is applied to the other of the first and second magnetostrictive films 31, 32. As a result, the magnetic permeability of one of the first and second magnetostrictive films 31, 32 increases, whereas the magnetic permeability of the other of the first and second magnetostrictive films 31, 32 decreases. Accordingly, the inductance of the detecting coils, which are disposed around one of the first and second magnetostrictive films 31, 32, increases, whereas the inductance of the detecting coils, which are disposed around the other of the first and second magnetostrictive films 31, 32, decreases.

The detecting circuit 35 converts changes in inductance of the detecting coils into failure detection signals VT1, VT2 and a torque signal (hereinafter referred to as a "steering torque") VT3, and supplies the signals VT1, VT2, VT3 to an ECU (Electronic Control Unit) 50.

The ECU 50 includes a microcomputer having a CPU, a ROM, a RAM, input/output interfaces such as an A/D converter and a D/A converter, and a timer, etc. The CPU of the microcomputer executes a program that is stored in the ROM based on various input signals. Accordingly, the CPU operates as various functional elements (various functional means) in order to control the motor 11, etc.

According to the present embodiment, a target current calculator 50A, which operates as one of the functions of the ECU 50, calculates a target current Itar based on respective output signals from the detecting circuit 35 (steering torque sensor 30), which detects the steering torque VT3 that acts on the pinion shaft 5 of the steering shaft 1, a rotational speed sensor (rotational speed detector) 14, which detects a rotational speed Nm of the motor 11, a vehicle speed sensor 16, which detects a running speed (vehicle speed) Vs of the vehicle, and a steering angle sensor 17, which detects a steering angle θs of the steering handle 2. More specifically, the target current calculator 50A calculates the target current Itar based on the steering torque VT3, the rotational speed Nm, the vehicle speed Vs, and the steering angle θs, and controls the motor 11 to bring the calculated target current Itar into conformity with the current Im that flows through the motor 11, thereby generating a steering assistive force. The generated steering assistive force functions to reduce the steering force that the driver of the vehicle applies to the steering handle 2.

A process of calculating an assistive current Ia and a target current Itar with the target current calculator 50A of the ECU 50 for thereby controlling the motor 11 will be described in detail below primarily with respect to a processing sequence of a phase compensator 62, in accordance with a principal feature of the present invention.

Figure 2:
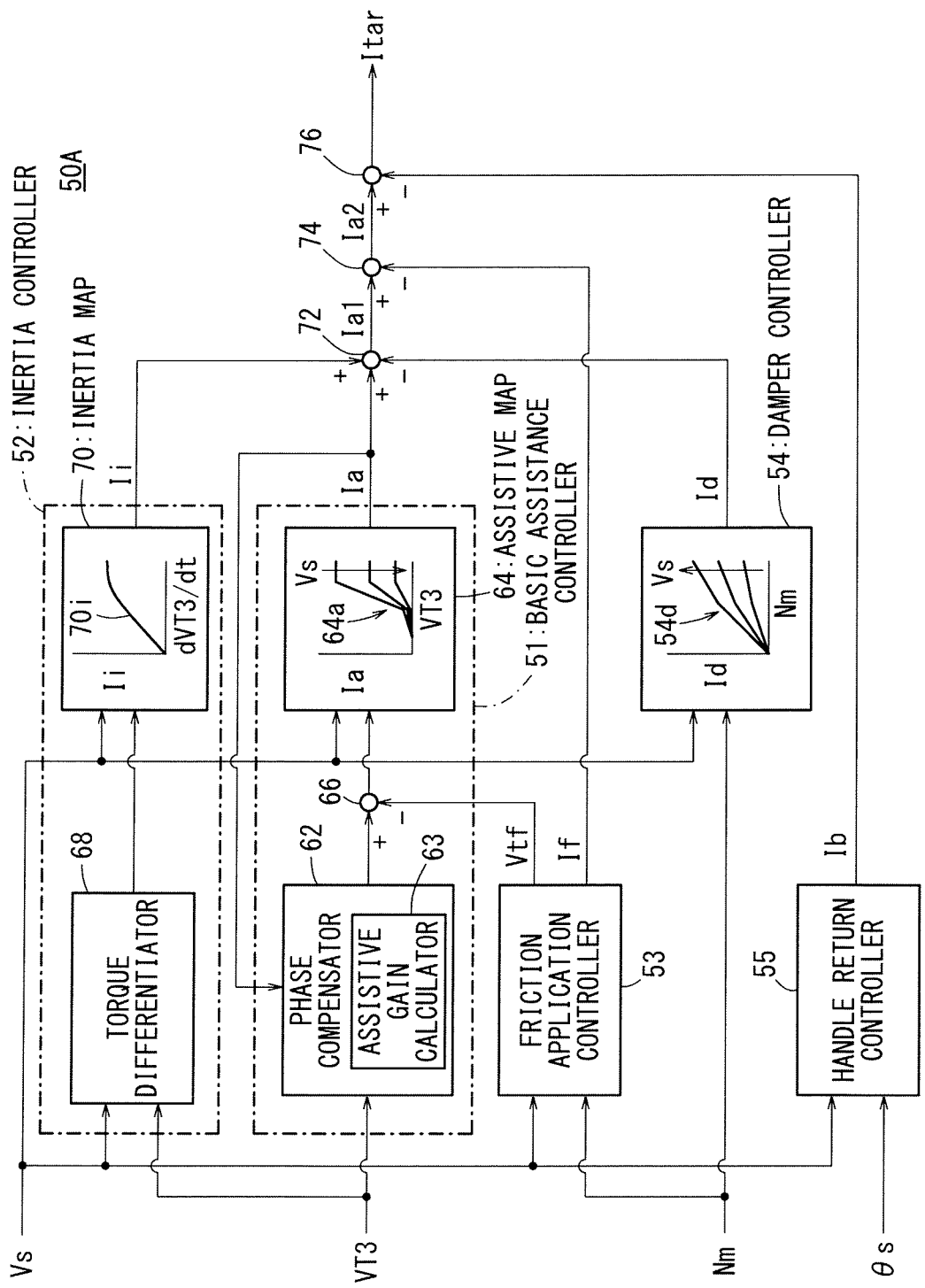
FIG. 2 is a functional block diagram of a target current calculator including a phase compensator of the electric power steering apparatus according to the embodiment.

FIG. 2 is a functional block diagram (target current calculating block diagram) of the target current calculator 50A of the ECU 50, for calculating an assistive current Ia and a target current Itar, which are supplied to the motor 11 to generate a steering assistive force.

As shown in FIG. 2, in order to reduce the steering force applied to the steering handle 2 by the driver, the target current calculator 50A essentially includes a basic assistance controller 51, an inertia controller 52, a friction application controller 53, a damper controller 54, and a handle return controller 55.

The basic assistance controller 51 includes the phase compensator 62, an assistive map (assistive characteristic curve section) 64, and a torque value subtractor (torque value subtracting section) 66.

The phase compensator 62 operates to compensate for a system response delay between a time at which the steering torque sensor 30 detects the steering torque VT3 and a time at which the speed reducing mechanism 19 applies the steering assistive force (boosted force) to the pinion shaft 5. In order to compensate for such a system response delay, the phase compensator 62 refers to the assistive current Ia, so as to generate a phase-compensated steering torque (also denoted by VT3), which has been compensated for the gain (amplitude) G [dB] and phase θ [deg] of the steering torque (steering torque signal) VT3 from the detecting circuit 35.

The assistive map 64 calculates the assistive current Ia (basic assistive current) based on the phase-compensated steering torque VT3 and the vehicle speed Vs.

The assistive map 64 represents an assistive characteristic curve 64a, which is indicated in the block thereof. The assistive characteristic curve 64a exhibits a characteristic such that the gain (assistive current Ia) becomes lower as the vehicle speed Vs is higher, and becomes higher as the steering torque VT3 is greater.

The assistive current Ia generally increases as the steering torque VT3 increases, and decreases as the vehicle speed Vs increases. Therefore, the motor 11 is able to generate a basic steering assistive force that matches the sensation of the driver.

The inertia controller 52 includes a torque differentiator 68 and an inertia map (inertia characteristic curve section) 70. In order to compensate for a drop in response due to the inertia (moment of inertia) of the rotor of the motor 11 at the time that turning (or returning) of the steering handle 2 is initiated, the torque differentiator 68 differentiates the steering torque VT3 and extracts, as a differential value $dVT3/dt$ (where d represents a differential operator), a transient response of the positive-going edge (or negative-going edge). The differential value $dVT3/dt$ is multiplied by a coefficient, which depends on a vehicle response characteristic change caused by the vehicle speed Vs, and the product is supplied to the inertia map 70.

The inertia map 70 represents an inertia characteristic curve 70i, which is indicated in the block thereof. The inertia map 70 calculates an inertia current Ii, which essentially is proportional to the supplied differential value $dVT3/dt$. A current calculator 72 (current adder/subtractor, current adding/subtracting section) adds the calculated inertia current Ii to the assistive current Ia.

In order to improve convergence of the steering handle 2, the damper controller 54 refers to a damper characteristic curve (damper map) 54d, which is indicated in the block thereof, based on the rotational speed Nm of the motor 11 and the vehicle speed Vs, and calculates a damper current Id, which becomes greater as the rotational speed Nm and the vehicle speed Vs are higher. The current calculator 72 subtracts the damper current Id from the sum of the assistive current Ia and the inertia current Ii, thereby producing an assistive current Ia1 that serves to reduce the rotational torque of the motor 11. Such a steering damper effect increases the convergence of the steering handle 2 (convergence of the vehicle).

The handle return controller 55 calculates a handle return current Ib based on the steering angle θs and the vehicle speed Vs in order to enhance the return (switch back) motion of the steering handle 2. The handle return controller 55 has a characteristic such that the steering handle 2 is returned naturally based on a SAT (Self-Aligning Torque), and the handle return current Ib is calculated according to such a characteristic. A current subtractor 76 (current subtracting section) subtracts the handle return current Ib from an assistive current Ia2. Accordingly, the rotational torque of the motor 11 can smoothly be reduced depending on a reduction in the steering angle θs.

The friction application controller 53 calculates an application friction torque Vtf based on the rotational speed Nm of the motor 11 and the vehicle speed Vs, and converts the application friction torque Vtf into an application friction current If. The torque value subtractor 66 subtracts the application friction torque Vtf from the phase-compensated steering torque VT3, and a current subtractor 74 (current subtracting section) subtracts the application friction current If from the assistive current Ia1. Thus, it is possible for a mechanical friction to be applied electrically to the electric power steering apparatus 100.

Accordingly, as shown in FIG. 2, the target current Itar that flows through the motor 11 is calculated according to the following equation (1):

$$Itar = Ia2 - Ib \quad (1)$$
$$= (Ia1 - \text{If}) - Ib$$
$$= (Ia + Ii - Id) - \text{If} - Ib$$

When supplied with the steering torque VT3, the phase compensator 62 produces a phase-compensated steering torque VT3, in which the settings (default settings) of the gain G=Gmin and the phase θ=θmin are phase-compensated.

The torque value subtractor 66 subtracts the application friction torque Vtf from the output signal (corrected steering torque VT3) that is output by the phase compensator 62, and supplies the corrected steering torque VT3 to the assistive map 64. Referring to the assistive characteristic curve 64a, the assistive map 64 calculates an assistive current Ia with respect to the vehicle speed Vs detected by the vehicle speed sensor 16 and the steering torque VT3 detected by the steering torque sensor 30. The calculated assistive current Ia is fed back to the phase compensator 62. The phase compensator 62 includes an assistive gain calculator 63, which calculates an assistive gain Ga according to the following equation (2):

$$Ga = Ia \div VT3 \quad (2)$$

In other words, the assistive gain Ga is calculated as a division result (quotient), which is produced when the assistive current Ia produced by the assistive map 64 is divided by the steering torque VT3 produced by the detecting circuit 35.

Figure 3:
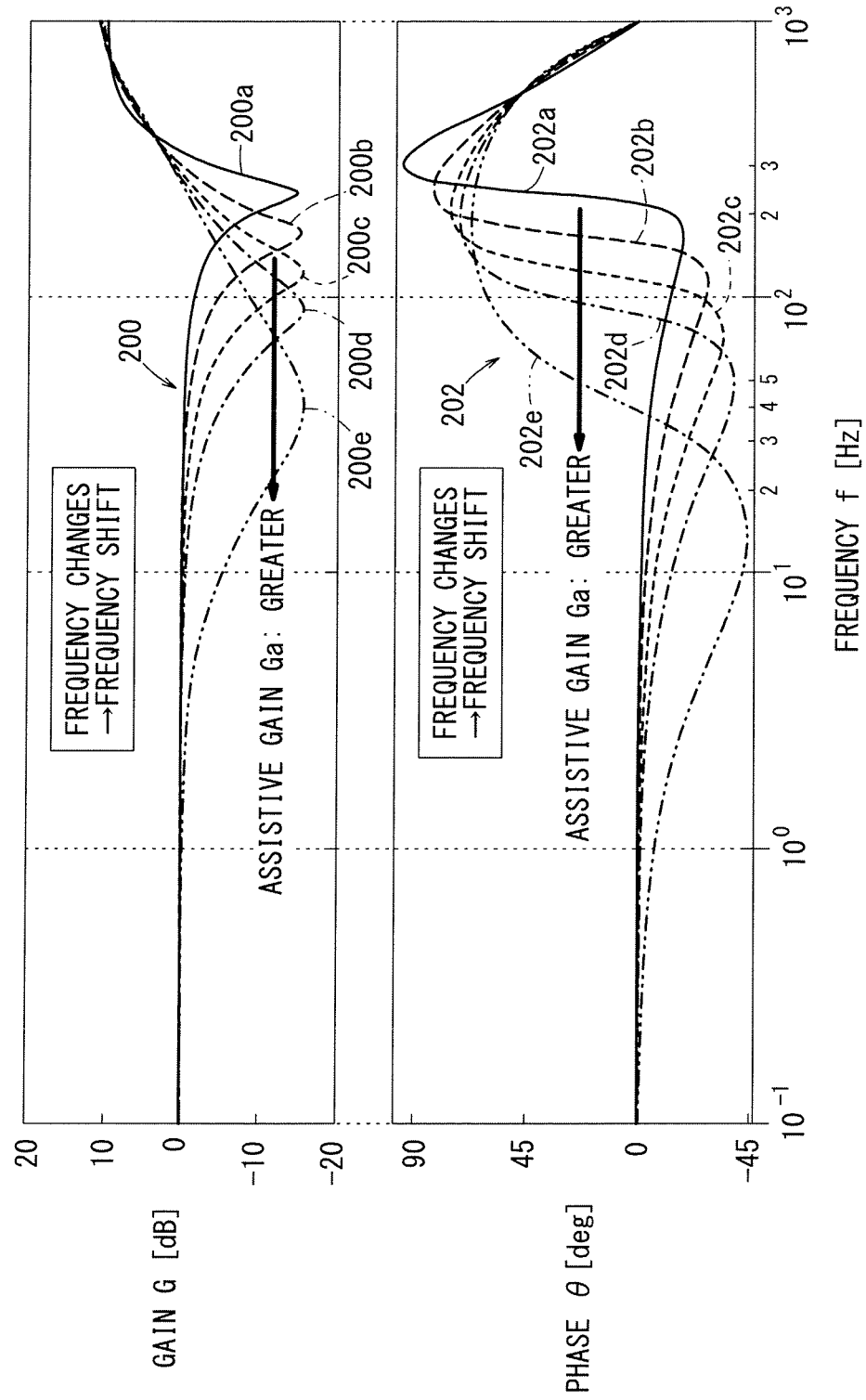
FIG. 3 is a Bode diagram illustrating the manner in which the phase compensator of the target current calculator operates.

The phase compensator 62 according to the present embodiment sets a gain G [dB] based on a gain characteristic curve 200, which is shown in an upper portion of the Bode diagram shown in FIG. 3. In addition, the phase compensator 62 sets a phase θ [deg] based on a phase characteristic curve 202, which is shown in a lower portion of the Bode diagram shown in FIG. 3.

With respect to setting of the phase θ, as can be seen from the phase characteristic curve 202 shown in FIG. 3, the phase compensator 62 applies respective characteristic curves 202a, 202b, 202c, 202d, 202e, such that as the assistive gain Ga (Ga=Ia/VT3) becomes greater, a frequency band by which the phase is compensated (compensation frequency band) changes to lower frequencies (referred to as a "frequency shifting process").

At this time, with respect to setting of the gain G, as can be seen from the gain characteristic curve 200 shown in FIG. 3, the phase compensator 62 applies respective characteristic curves 200a, 200b, 200c, 200d, 200e, such that as the assistive gain Ga (Ga=Ia/VT3) becomes greater, a frequency band by which the gain is compensated (compensation frequency band) changes to lower frequencies (referred to as a "frequency shifting process"). It should be noted that the characteristic curves 200a through 200e are of values such that, as described above, the gain G [dB] essentially does not increase the steering torque VT3 at frequencies equal to or less than 300 [Hz] where the motor 11 is susceptible to vibrations and abnormal noise.

Since the frequency shifting characteristic for phase compensation is set variably depending on the assistive gain Ga, it is possible to handle a change in the compensation frequency, as determined by the assistive gain Ga, for thereby enabling higher control stability.

More specifically, the frequency shift of the phase θ toward lower frequencies provides a sufficient steering assistive force when the vehicle travels at lower speeds, and the frequency shift of the phase θ toward higher frequencies provides a steering response (quick steering) when the vehicle travels at higher speeds.

When a frequency shift is made toward higher frequencies for thereby reducing an assistance delay at a frequency of several tens of hertz [Hz], since the gain G [dB] is not increased in the frequency band (100 to 300 [Hz]) that is susceptible to noise, the steering system including the motor 11 does not cause fine vibrations and abnormal noise. Accordingly, the electric power steering apparatus 100 allows the driver to experience a good steering sensation, and hence the commercial value of the electric power steering apparatus 100 is increased.

An example of a signal processing sequence, which is carried out by the phase compensator 62 to bring about a frequency shift of the phase θ without increasing the gain G [dB], will be described below.

A transfer function (transfer characteristic) G(Z) of a phase compensation of a digital filter, which is expressed as a discrete system using a delay operator $Z^{-1}$, is given according to the following equation (3):

$$G(Z) = (D0 \cdot Z^2 + D1 \cdot Z + D2)/(D3 \cdot Z^2 + D4 \cdot Z + D5) \quad (3)$$

where D0, D1, D2, D3, D4, and D5 represent coefficients.

Using a corrective coefficient α (constant), the equation (3) is rewritten into the following equation (4):

$$G(Z) = \{D0 \cdot Z^2 + (D1+\alpha) \cdot Z + D2\}/\{D3 \cdot Z^2 + D4 \cdot Z + (D5+\alpha)\} \quad (4)$$

Locations at which the corrective coefficient α is applied in the above equation are given by way of example. It is to be noted that, apart from the above locations, there is a combination of locations in which a characteristic change (a frequency shift of the phase) occurs similar to the characteristic change to be described below.

A characteristic change occurs when the corrective coefficient α in equation (4) is changed depending on the assistive gain Ga and the assistive current Ia.

For example, when the corrective coefficient α is changed as α=0, 100, 400, a relationship is expressed as shown in the following equation (5):

$$G(Z)=\{3224Z^2+(-6005+\alpha)Z+2832\}/\{2048Z^2-1653Z+(-344+\alpha)\} \quad (5)$$

where zero-point frequencies and pole frequencies are calculated as described below. It is assumed that the sampling time of the digital filter is 0.5 [ms].

When α=0, zero-point frequencies are given as fzmin1=41.4 [Hz] and 41.4 [Hz] (the attenuation coefficient is 0.500), which are identical frequencies in the form of so-called multiple roots. Pole frequencies are given as fpmin1=6.84 [Hz] and fp1=900 [Hz].

When α=100, zero-point frequencies are given as fzmin2=71.5 [Hz] and 71.5 [Hz] (the attenuation coefficient is 0.292), which are identical frequencies in the form of multiple roots. Pole frequencies are given as fpmin2=21.5 [Hz] and fp2=823 [Hz].

When α=400, zero-point frequencies are given as fzmin3=125 [Hz] and 125 [Hz] (the attenuation coefficient is 0.171), which are identical frequencies in the form of multiple roots. Pole frequencies are given as fpmin3=82.0 [Hz] and fp3=593 [Hz].

The attenuation coefficient, which represents a degree of attenuation, becomes smaller as α is greater. As the degree of attenuation, i.e., the attenuation coefficient, becomes smaller, a region in which both the gain and the phase change exists appears as a sharp region.

Figure 4:
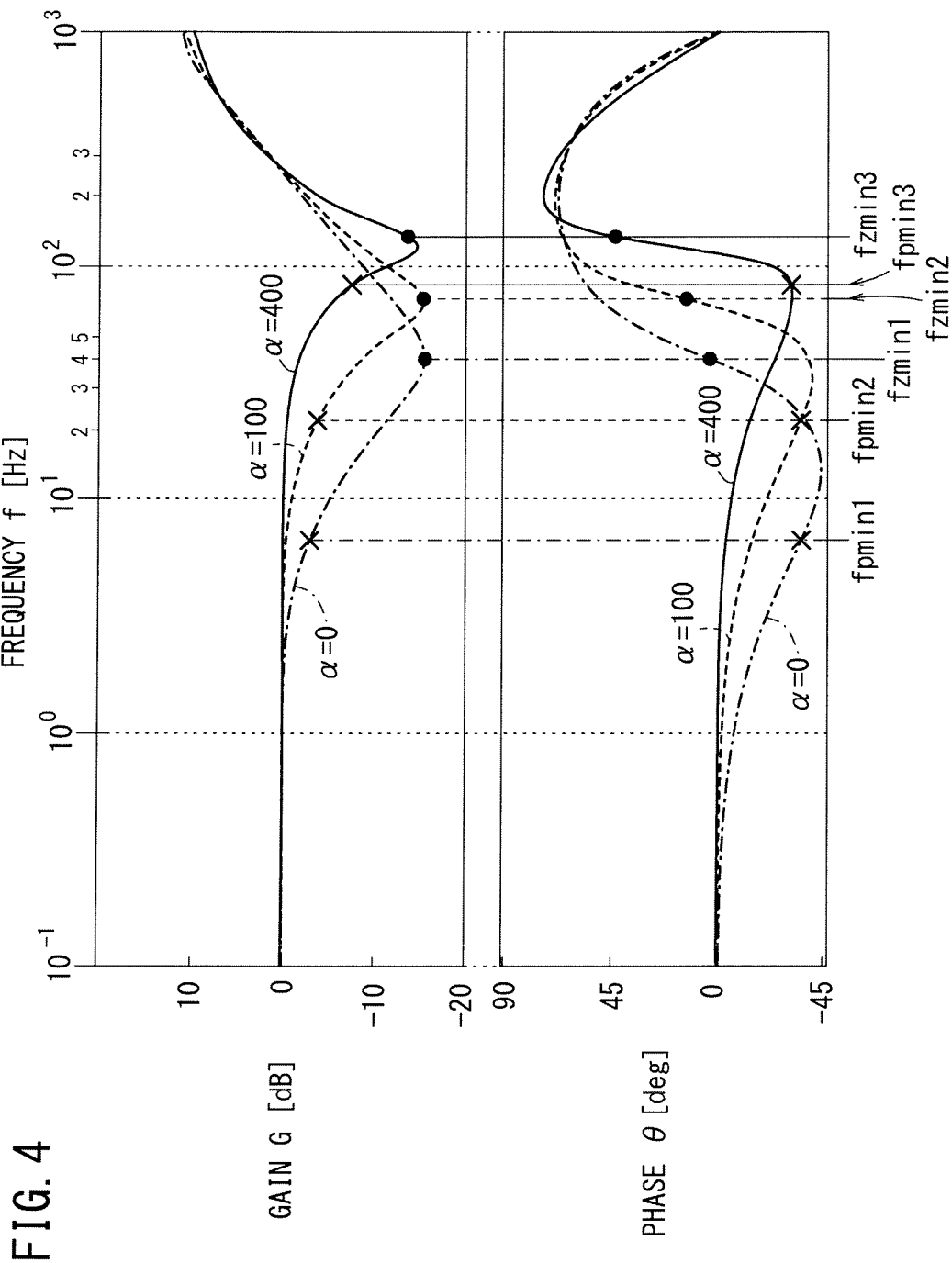
FIG. 4 is a Bode diagram illustrating an example of a phase compensation process for frequency-shifting a phase without an increase in gain.

Accordingly, the characteristic curves can be changed as shown in FIG. 4.

More specifically, as the corrective coefficient α changes from a larger value α=400 to smaller values α=100, α=0, it is possible for a frequency shift to be made, which changes the characteristic curve of the gain G and the characteristic curve of the phase θ of the transfer function G [Z], so as to be shifted toward lower frequencies without increasing the gain G.

Overview of the Embodiment

As described above, the electric power steering apparatus 100 according to the present embodiment controls the motor 11 depending on the steering torque VT3 applied to the steering handle 2, which serves as an operating member. The electric power steering apparatus 100 then transmits the drive force generated by the motor 11 to the steering mechanism in order to assist in steering the vehicle.

The electric power steering apparatus 100 includes the steering torque sensor 30, which detects the steering torque VT3, the phase compensator 62, which phase-compensates the steering torque VT3 represented by the torque signal generated by the steering torque sensor 30, and the assistive map 64, which serves as an assistive current determiner for determining an assistive current Ia that flows through the motor 11 based on at least the steering torque VT3, which has been phase-compensated by the phase compensator 62. As shown in FIG. 4, the phase compensator 62 frequency-shifts both the poles of minimum frequencies (fpmin1, fpmin2, fpmin3) and the zero points of minimum frequencies (fzmin1, fzmin2, fzmin3) toward higher frequencies.

More specifically, the phase compensator 62 performs a frequency shifting process for frequency-shifting combinations of the poles of minimum frequencies and the zero points of minimum frequencies [the poles of minimum frequencies, the zero points of minimum frequencies] toward higher frequencies such that [fpmin1, fzmin1]→[fpmin2, fzmin2]→[fpmin3, fzmin3]. Alternatively, the phase compensator 62 performs a frequency shifting process for frequency-shifting both the poles of minimum frequencies (fpmin1, fpmin2, fpmin3) and the zero points of minimum frequencies (fzmin1, fzmin2, fzmin3) toward lower frequencies, i.e., frequency-shifting the poles and zero-points of minimum frequencies toward lower frequencies such that [fpmin3, fzmin3]→[fpmin2, fzmin2]→[fpmin1, fzmin1]. In this manner, the compensation frequency band that is compensated by the phase compensator 62 is changed.

Since the phase compensator 62 performs a phase shift in the compensation frequency band by performing a frequency shifting process for the phase θ, rather than by increasing the compensation gain, it is possible to minimize generation of fine vibrations and abnormal noise in the steering system including the motor 11 due to an increase in gain. Hence, the electric power steering apparatus 100 allows the driver of the vehicle to experience an improved steering sensation, and the commercial value of the electric power steering apparatus 100 is increased.

According to the present embodiment, the phase compensator 62 calculates an assistive gain Ia/VT3 as a ratio of the assistive gain Ia determined by the assistive map 64 to the steering torque VT3 detected by the steering torque sensor 30. Then, the phase compensator 62 changes the compensation frequency band that is compensated by the phase compensator 62 according to a frequency shifting process, toward lower frequencies as the calculated assistive gain Ia/VT3 becomes greater (see FIG. 3).

Consequently, the change of the phase θ toward lower frequencies provides a sufficient steering assistive force when the vehicle travels at lower speeds, whereas the change of the phase θ toward higher frequencies provides a steering response (quick steering) when the vehicle travels at higher speeds, thereby preventing vibrations and abnormal noise from being generated.

According to another embodiment, which achieves the same advantages as those described above, the phase compensator 62 changes the compensation frequency band that is compensated by the phase compensator 62 according to the frequency shifting process, toward higher frequencies as the vehicle speed Vs detected by the vehicle speed sensor 16 becomes higher. Accordingly, quick responsiveness of the system is improved.

Further, the phase compensator 62 changes the compensation frequency band that is compensated by the phase compensator 62 according to the frequency shifting process, toward lower frequencies as (the absolute value of) the steering torque VT3 detected by the steering torque sensor 30 becomes greater. Accordingly, a sufficient steering assistive force is maintained.

Furthermore, the phase compensator 62 changes the compensation frequency band that is compensated by the phase compensator 62 according to the frequency shifting process, toward lower frequencies as (the absolute value of) the assistive current Ia determined by the assistive map 64, which functions as an assistive current determiner, becomes greater. Accordingly, a sufficient steering assistive force is maintained.

Figure 5:
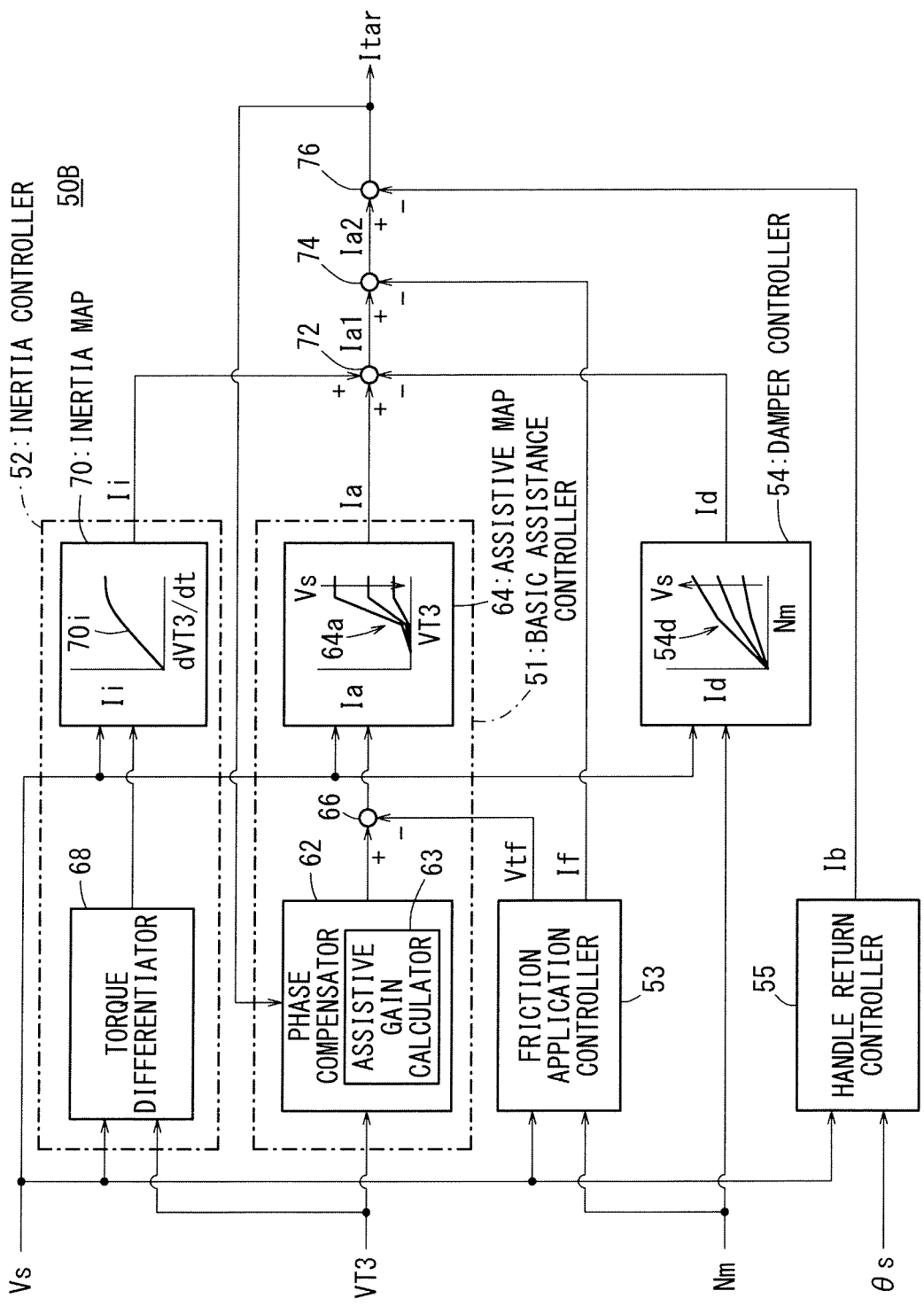
FIG. 5 is a functional block diagram of a target current calculator including a phase compensator according to another embodiment of the present invention.
Figure 6:
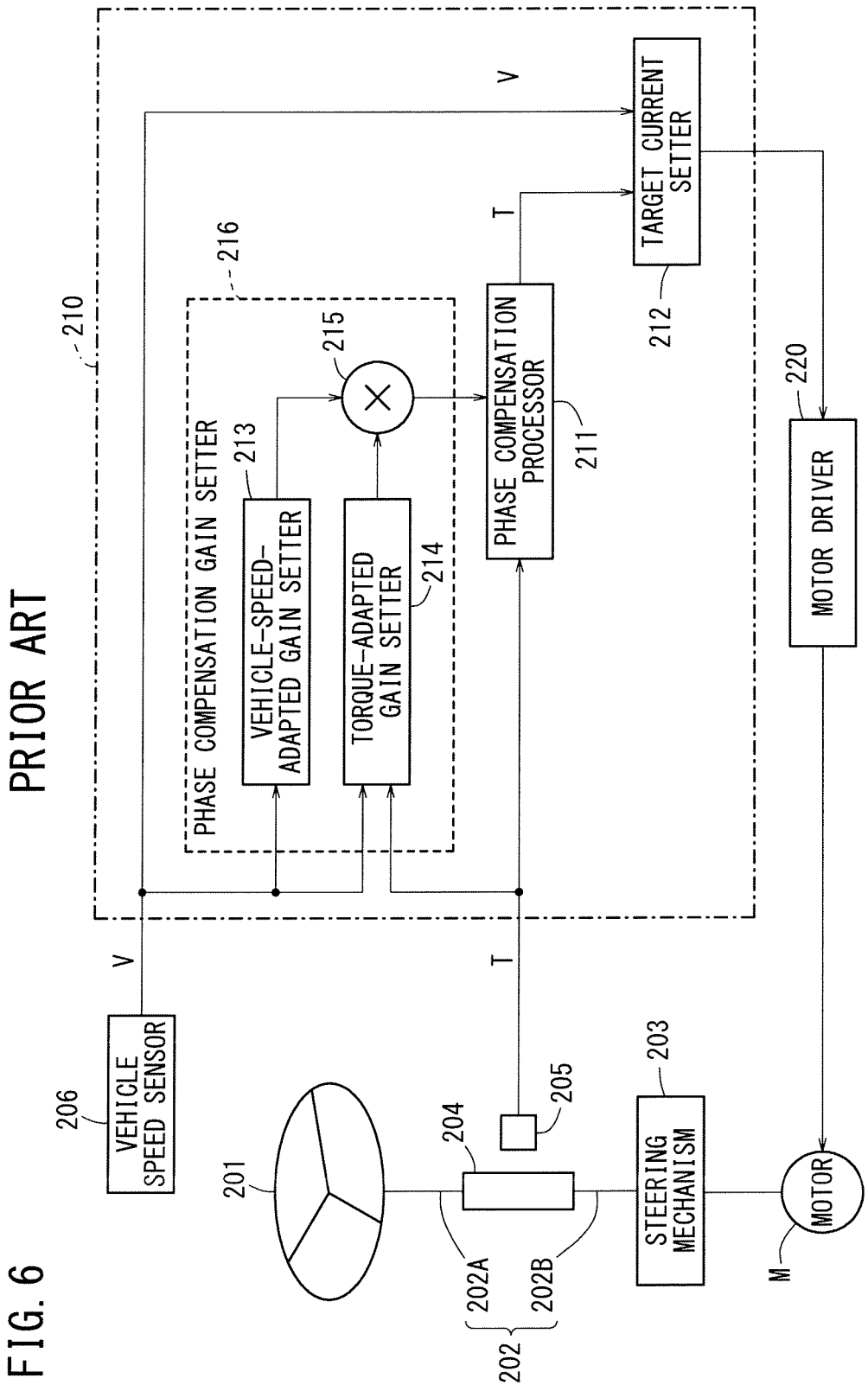
FIG. 6 is a view of an electric power steering apparatus for performing a phase compensation according to the background art.
Figure 7:
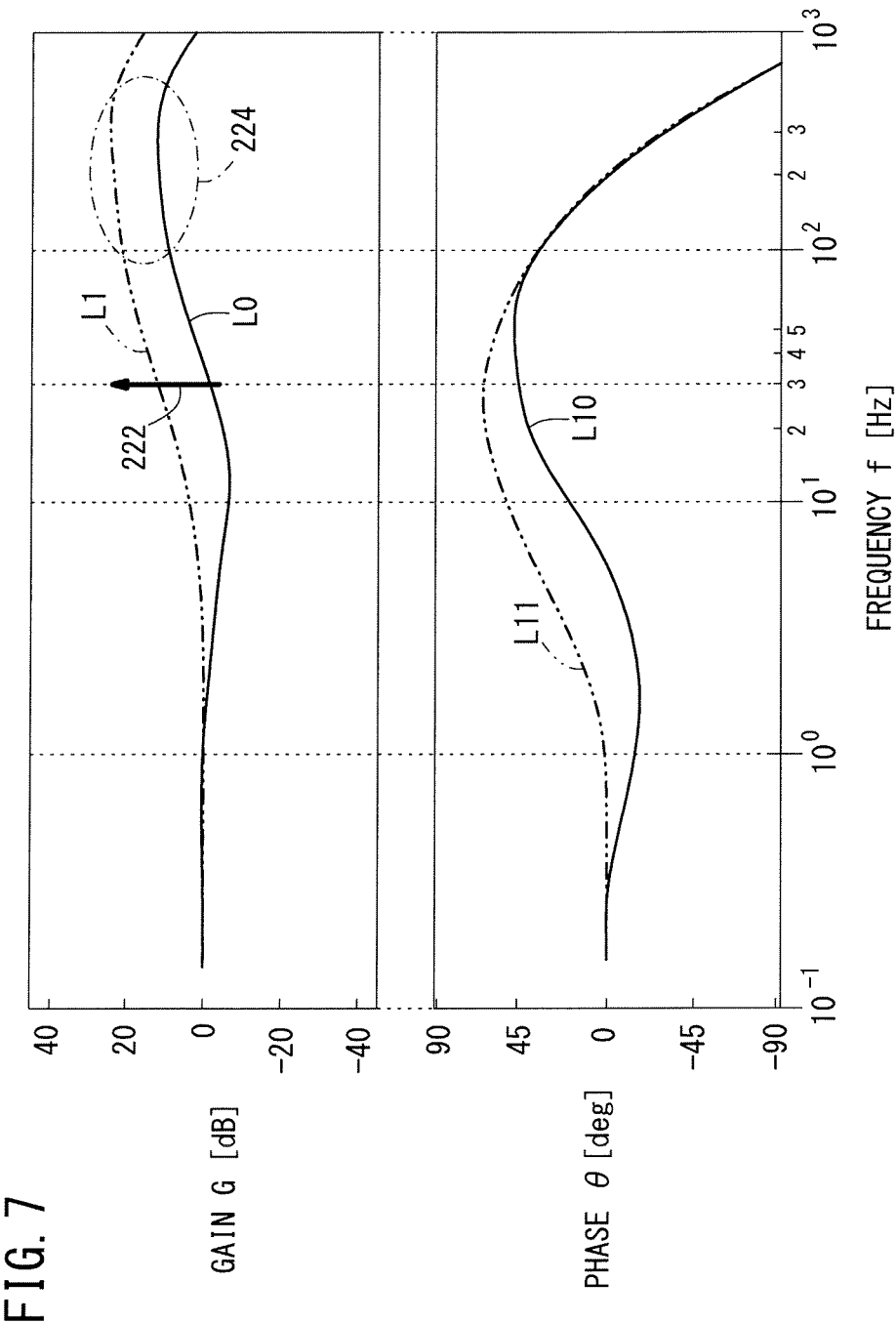
FIG. 7 is a Bode diagram illustrating the manner in which the electric power steering apparatus shown in FIG. 6 operates.

When performing phase compensation, the phase compensator 62 is not limited to referring to the assistive current Ia, but may refer to a target current Itar, as determined by a target current calculator 50B shown in FIG. 5. In this case, the assistive gain calculator 63 may calculate the assistive gain as a ratio Itar/VT3=target current÷steering torque.

The present invention is not limited to the above-described embodiments, but various arrangements may be adopted therein based on the disclosed description of the present invention. For example, the friction application controller 53 and the handle return controller 55 may be omitted from the target current calculators 50A, 50B shown in FIGS. 2 and 5.

The invention claimed is:

1. An electric power steering apparatus for controlling an electric motor depending on a steering torque applied to an operating member, and transmitting a drive force generated by the electric motor to a steering mechanism to assist in steering a vehicle, comprising:
   a steering torque sensor for detecting the steering torque;
   a phase compensator for phase-compensating a torque signal output by the steering torque sensor; and
   an assistive current determiner for determining an assistive current that flows through the electric motor based on at least the torque signal, which is phase-compensated by the phase compensator,
   wherein the phase compensator performs a frequency shifting process for frequency-shifting both a pole of a minimum frequency and a zero point of a minimum frequency toward higher frequencies, or for frequency-shifting both a pole of a minimum frequency and a zero point of a minimum frequency toward lower frequencies, for thereby changing a compensation frequency band that is compensated by the phase compensator.

2. The electric power steering apparatus according to claim 1, further comprising:
   a vehicle speed detector for detecting a vehicle speed,
   wherein the phase compensator changes, toward higher frequencies, the compensation frequency band that is compensated by the phase compensator according to the frequency shifting process, as the vehicle speed detected by the vehicle speed detector becomes higher.

3. The electric power steering apparatus according to claim 1, wherein the phase compensator changes, toward lower frequencies, the compensation frequency band that is compensated by the phase compensator according to the frequency shifting process, as the torque signal detected by the steering torque sensor becomes greater.

4. The electric power steering apparatus according to claim 1, wherein the phase compensator changes, toward lower frequencies, the compensation frequency band that is compensated by the phase compensator according to the frequency shifting process, as the assistive current determined by the assistive current determiner becomes greater.

5. The electric power steering apparatus according to claim 1, wherein the phase compensator calculates an assistive gain as a ratio of the assistive current determined by the assistive current determiner to the torque signal detected by the steering torque sensor, and changes, toward lower frequencies, the compensation frequency band that is compensated by the phase compensator according to the frequency shifting process, as the calculated assistive gain becomes greater.

* * * * *